United States Patent [19]

Zawodni

[11] Patent Number: 4,679,667
[45] Date of Patent: Jul. 14, 1987

[54] ANCHOR PIN RETAINER

[75] Inventor: Frank W. Zawodni, Ft. Wayne, Ind.

[73] Assignee: Dana Corporation, Toledo, Ohio

[21] Appl. No.: 792,074

[22] Filed: Oct. 28, 1985

[51] Int. Cl.$^4$ ............................................. F16D 65/04
[52] U.S. Cl. .................... 188/341; 188/216; 188/327; 192/75
[58] Field of Search ............... 188/341, 327, 328, 329, 188/330, 334, 337, 338, 339, 250 C, 205 A, 216; 192/75, 30 V

[56] References Cited

U.S. PATENT DOCUMENTS

| 1,928,059 | 9/1933 | LaBrie | 188/338 |
| 2,398,717 | 4/1946 | Owens | 188/327 |
| 4,130,189 | 12/1978 | Katagiri et al. | 188/328 |
| 4,476,968 | 10/1984 | Urban et al. | 188/341 A |
| 4,503,953 | 3/1985 | Majewski | 188/330 |

FOREIGN PATENT DOCUMENTS

| 1109810 | 9/1981 | Canada | 188/329 |
| 44377 | 1/1982 | European Pat. Off. | 188/330 |
| 1335100 | 7/1963 | France | 188/216 |

Primary Examiner—George E. A. Halvosa
Attorney, Agent, or Firm—Frank B. McDonald

[57] ABSTRACT

A brake shoe assembly incorporates unitary retainers for anchor pins about which a pair of brake shoes may pivot. In a preferred form, the anchor pin retainers are spring steel structures formed of drawn heat treated wire, each retainer defining a pair of spaced legs joined at one end by an arcuate or bowed portion adapted to engage one of a pair of spaced grooves in one of the associated anchor pins. Each brake shoe contains a web portion which includes a cradle for pivotal support against an anchor pin. Each web has a pair of apertures disposed for engagement by a hook formed at the end of each retainer leg.

10 Claims, 3 Drawing Figures

ANCHOR PIN RETAINER

BACKGROUND OF THE INVENTION

The present invention relates to retension of brake shoes against anchor pins as utilized to provide for pivotal securement of the shoes in heavy duty brake assemblies. More particularly, the invention relates to the retention of brake shoes having crescent shaped ends by special devices which couple the shoes to the anchor pins, most critically during the dynamic braking action of the shoes.

Heavy duty brake assemblies of the prior art provide many mechanisms for permitting a brake shoe with crescent shaped ends to pivot while remaining in contact with an anchor pin. Many of the designs which utilize crescent brake shoe ends include a brake shoe retainer spring which extends from one of a pair of brake webs to the other of the pair in order to hold the crescent shaped ends against their respective associated anchor pins. Several other designs utilize set screws or snap rings to axially retain the anchor pins within web apertures, particularly where dual webbed brake shoe constructions are employed. Each of the aforenoted designs typically requires the use of special tools for assembly and disassembly, and do not generally facilitate simple, convenient brake reconstruction and repair.

Thus, a simpler mechanism for retention of brake shoe to anchor pin is desired in order to provide for ease of assembly and disassembly without requiring special efforts.

SUMMARY OF THE INVENTION

The present invention provides a brake shoe assembly which includes a unitary spring steel anchor pin retainer sufficient to overcome the aforestated drawbacks of the prior art. In a preferred form, the retainer is of a heat-treated, drawn wire structure which entirely alleviates the need for brake shoe retainer springs. The retainer surroundingly engages an anchor pin, and is hooked to an associated brake shoe web. As such, the need for set screws or snap rings to axially retain the anchor pins is obviated.

In the same preferred form, the retainer is utilized in pairs; each pair supporting a dual webbed brake shoe against a single anchor pin for pivotal engagement therewith. Each retainer includes a pair of spaced legs joined at one end by an arcuate or bowed portion adapted to engage one of two spaced grooves at opposed extremities of the anchor pin. Each leg contains a free end which includes a hook, each hook being disposed for engagement with one of a pair of corresponding apertures in each web.

DETAILED DESCRIPTION OF A PREFERRED EMBODIMENT

Figure 1:
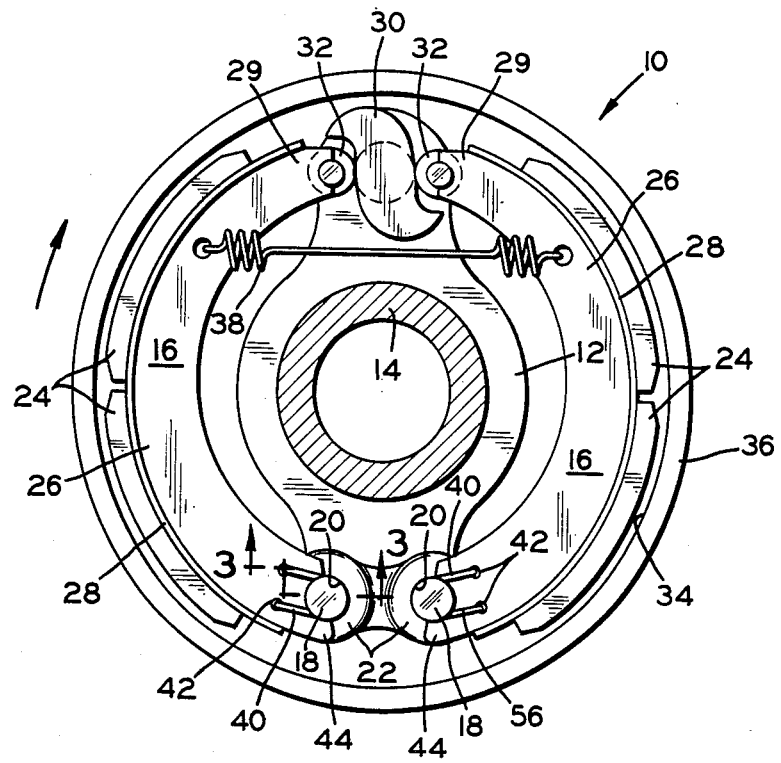
FIG. 1 is a cross sectional view of a heavy duty brake assembly which incorporates a preferred embodiment of the anchor pin retainer of the present invention.

Referring initially to FIG. 1, a heavy duty vehicular brake assembly 10 is shown in cross section. The brake assembly 10 incorporates a spider 12 fastened to an axle housing 14. A pair of brake shoes 16 (referenced hereinafter as left and right) are pivotally secured to a pair of corresponding left and right anchor pins 18. The pins 18 are secured within corresponding left and right bores 20 which extend through a pair of bosses 22 through the spider 12.

Each brake shoe 16 includes a pair of friction lining pads 24 which are riveted, bonded, or otherwise attached to a pad support table 28. The table 28 is integral with and supported by a pair of webs 26. The brake shoes 16 are actuated by an S-cam 30 which engages a pair of roller-type cam followers 32 at the cam ends 29 of the brake shoes 16. As will be appreciated by those skilled in the art, rotation of the S-cam 30 will cause the friction lining pads 24 of the brake shoes to engage the friction surface 34 of the brake drum 36 for purposes of either slowing or stopping an associated vehicle A return spring 38 is effective to pull the brake shoes 16 away from engagement with the brake drum upon return of the S-cam 30 to its neutral position as shown. Thus, it will be seen that movements of the brake shoes 16 are of a rotary nature, whereby the left and right shoes 16 pivot in counter directions to each other about corresponding anchor pins 18. Engaging each anchor pin 18 are a pair of spring steel wire anchor pin retainers 40, each anchor pin retainer having a pair of legs 56 which engage apertures 42 in the anchor pin ends 44 of an associated web 26.

Figure 2:
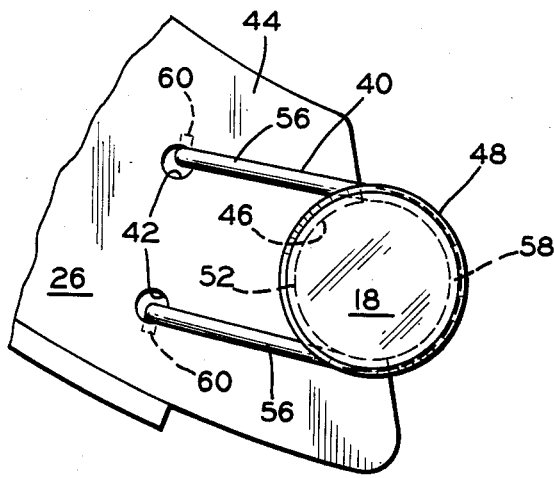
FIG. 2 is an enlarged view of the anchor pin retainer of FIG. 1, including views of an associated anchor pin and brake shoe web pivotally affixed to the anchor pin.
Figure 3:
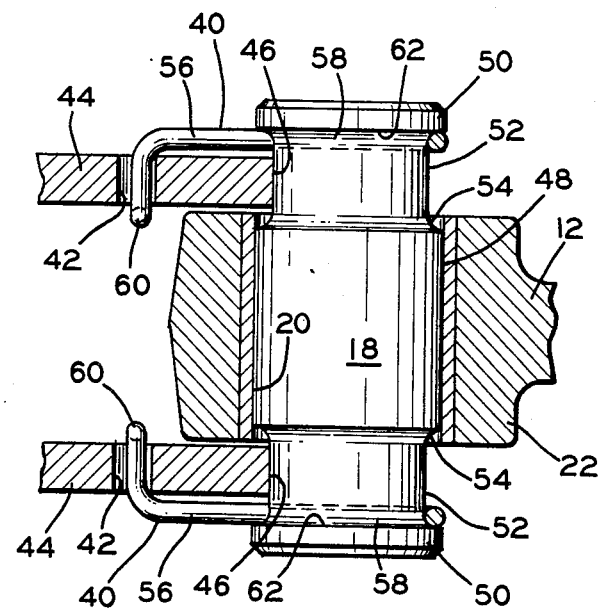
FIG. 3 is a fragmentary view of an anchor pin supported within an associated spider boss, a pair of anchor pin retainers, and a pair of webs associated therewith; all as viewed along lines 3—3 of FIG. 1.

Referring now to FIGS. 2 and 3, it will be apparent that each anchor pin 18 is held against a pair of crescent-shaped cradles 46 formed in the anchor pin ends 44 of each of a pair of webs 26. Each anchor pin has a stepped diameter, wherein a larger diameter central portion 48 is rotatably supported within a bore 20 of a boss 22, as earlier noted. However, at the extremities of the anchor pin are integral flanges 50 which define a pair of grooves 52, each situated on one side of the central portion 48 and between the respective integral end flanges 50. Each groove 52 provides a small diameter portion of the anchor pin 18 which directly engages one of the cradles 46 of the pair of webs 26.

Each groove 52 also houses an arcuate portion 58 of one retainer 40. A set of spaced legs 56 extends from each arcuate portion 58, each leg 56 terminating in a hook 60 disposed perpendicularly to its respective leg for engagement of one of the pair of retainer apertures 42 in each web 26. Although substantially parallel when the hooks are inserted, the legs are preferably normally spring-biased apart at a slight acute angle with respect to one another to enhance retention of the hooks in the apertures. In the same preferred embodiment, each anchor pin retainer 40 is positioned so that the arcuate portion 58 thereof bears directly against the inside wall 62 of an end flange 50, thus centering and axially retaining the anchor pin 18 within a spider bore 20.

Referring now particularly to FIGS. 1 and 3, a description of the dynamic operation of the brake assembly will provide further detail relating to the benefits of the subject anchor pin retainer.

Depending on the direction the wheel is rotating (refer to the arrow of FIG. 1), one of the brake shoes will tend to be self-actuating. Thus, whenever the brake assembly is actuated, the S-cam 30 causes the shoes to pivot about the anchor pins 18 in a manner to urge the friction lining pads 24 into contact with the brake drum 36. Such action will be effective to inhibit rotation of the brake drum and the wheel to which the drum is attached.

However, friction forces between the brake drum and lining pads secured to the brake shoes 16 will tend to draw the lining pads into further contact with the brake drum thereby increasing the magnitude of the friction force. The latter force will be most effective in the general direction of the force applied by the cam actuator, and will complement the brake actuating force. Thus, referring to FIG. 1, indicating a clockwise wheel rotation, the right brake shoe 16 will tend to be self-actuating, while the left brake shoe 16 will tend to be self-deactuating. This condition is particularly exacerbated by distortion of the brake drum and shoes under dynamic braking conditions. Thus, during braking the brake drum actually becomes elliptical, and the brake shoes expand radially about the mid-point of the brake shoes. This action will afford additional clearance for the anchor ends of the brake shoes to move away from the anchor pins to the extent that the brake shoe webs are not secured against such movement. As will be appreciated by those skilled in this art, movement of the brake shoes away from the anchor pin will cause undesirable noise and chatter as well as unnecessary rapid wear of the lining on the brake shoe most subject to the self-actuation.

Hence, the present invention provides for an anchor pin retainer 40 which will retain the anchor pin end 44 of each brake shoe web 26 against an anchor pin 18 associated therewith, regardless of the rotation of the brake drum, and regardless of whether the particular shoe is operating under a self-actuation or self-deactuation force.

Although only one preferred embodiment is shown and described herein, the following claims are envisioned to cover numerous alternative embodiments which may fall within the spirit and scope thereof.

What is claimed is:

1. In a brake assembly of the type including a brake drum, a pair of brake shoes including a pair of webs supporting each of said shoes, said webs having adjacent ends pivotally mounted to a pair of anchor pins, and actuating means disposed between the opposite ends of said shoes to pivot said shoes into frictional contact with said drum; an improvement comprising a pair of unitary retainers engaging each of said anchor pins, a first retainer of each pair of retainers being located adjacent one web of each said pair of webs and a second retainer of each pair of retainers being located adjacent the other web of each said pair of webs, each retainer including an arcuate portion partially encircling a respective one end of one of said anchor pins, each retainer comprising a pair of spaced legs, each leg having an integral hook on the end thereof in engagement with one of said webs, said spaced legs being substantially parallel, said legs extending in the same direction from opposed sides of said arcuate portion of said retainer whereby each of said pairs of web is circumferentially retained by one of said pairs of retainers against one of said anchor pins.

2. The brake assembly of claim 1 wherein said retainer comprises a spring steel body formed of a heat treated drawn wire, and wherein said pairs of spaced legs of each retainer engaging a respective one end of an anchor pin.

3. The brake assembly of claim 2 wherein each of said webs comprises a web portion, and wherein each web portion includes a pair of apertures for receiving said hooks of one of said retainers.

4. The brake assembly of claim 3 wherein each of said anchor pins comprises a stepped diameter member, having smaller diameter portions at the ends thereof, each of said small diameter portions having an integral flange to thereby define a groove on each end of said member.

5. The brake assembly of claim 4 wherein each of said grooves of each anchor pin is disposed for accommodating both one of said webs and one of said anchor pin retainers side by side therein.

6. The brake assembly of claim 5 wherein each of said webs defines a cradle, each cradle disposed for retention against one of said anchor pin grooves by one of said anchor pin retainers, said cradle defining a crescent-shaped recess at anchor pin ends of said brake shoes, wherein said brake shoes are pivotally mounted to said anchor pins by said retainers.

7. The brake assembly of claim 6 wherein said pairs of spaced legs of each retainer are spring biased apart when said hooks are inserted in said apertures.

8. The brake assembly of claim 7 wherein said legs each extend from said arcuate portion of one of said retainers to one of said pair of apertures of one of said web portions of said shoes.

9. The brake assembly of claim 8 wherein said integral hooks each extend perpendicularly to each respective leg of said retainer.

10. The brake assembly of claim 9 wherein each of said arcuate portions of said retainers is positioned axially outwardly of its associated web and bears directly against one flange of an anchor pin.

* * * * *